United States Patent [19]
Larson

[11] Patent Number: 5,309,566
[45] Date of Patent: May 3, 1994

[54] SYSTEM AND METHOD FOR CHARACTER TRANSLATION

[75] Inventor: Lawrence E. Larson, Boca Raton, Fla.

[73] Assignee: International Business Machines Corporation, Armonk, N.Y.

[21] Appl. No.: 830,820

[22] Filed: Feb. 4, 1992

[51] Int. Cl.$^5$ .............................................. G06F 13/00
[52] U.S. Cl. .................................................... 395/275
[58] Field of Search ................ 395/275, 375, 700, 50; 379/236, 229

[56] References Cited

U.S. PATENT DOCUMENTS

| | | |
|---|---|---|
| 4,470,038 | 9/1984 | Amano et al. . |
| 4,502,038 | 2/1985 | Lowenthal et al. . |
| 4,641,262 | 2/1987 | Bryan et al. . |
| 4,679,030 | 7/1987 | Volnak . |
| 4,777,600 | 10/1988 | Salto et al. . |
| 4,852,157 | 7/1989 | Tyrrell .......................... 379/236 |
| 4,891,786 | 1/1990 | Goldwasser . |
| 4,901,364 | 2/1990 | Faulkerson et al. . |
| 4,918,445 | 4/1990 | Bower . |
| 4,937,574 | 6/1990 | Wright . |
| 4,937,778 | 6/1990 | Wolf et al. . |
| 4,952,924 | 8/1990 | Chang et al. . |

*Primary Examiner*—Robert L. Richardson
*Attorney, Agent, or Firm*—Kenneth C. Hill; Andrew J. Dillon; Joseph P. Abate

[57] ABSTRACT

A translator suitable for use in a computer system provides an interpreter and a translation table defining a state machine. The interpreter steps through the states of the state machine defined in the translation table to perform translation of input characters or codes into output characters or codes. The interpreter is fixed, and does not affect the translation to be performed. The translation function is defined entirely within the translation table, and selecting a different translation table for use by the interpreter selects a different translation function. All of the required actions are defined in the translation table with no additional external procedures being required.

8 Claims, 4 Drawing Sheets

| STATE | INPUT | OUTPUT | NEXT | SPTR | TPTR |
|---|---|---|---|---|---|
| 62 → 1 | 1 | A | 1 | +1 | +1 |
| 64 → 1 | 2 | B | 1 | +1 | +1 |
| 66 → 1 | 3 | C | 1 | +1 | +1 |
| 68 → 1 | 4 | D | 1 | +1 | +1 |

*Fig. 6*

| STATE | INPUT | OUTPUT | NEXT | SPTR | TPTR |
|---|---|---|---|---|---|
| 1 | 1 | A | 1 | +1 | +1 |
| 1 | 2 | B | 1 | +1 | +1 |
| 70 { 1 | 3 | C | 1 | +1 | +1 |
| . . . . | | | | | |
| 72 → 1 | 26 | Z | 1 | +1 | +1 |
| 76 → 1 | 27(Æ) | A | 2 | +0 | +1 |
| 1 | 28(Ü) | U | 3 | +0 | +1 |
| 74 → 2 | 27(Æ) | E | 1 | +1 | +1 |
| 78 → 3 | 28(Ü) | E | 1 | +1 | +1 |

*Fig. 7*

| STATE | INPUT | OUTPUT | NEXT | SPTR | TPTR |
|---|---|---|---|---|---|
| 82 → 1 | A | A | 2 | +1 | +0 |
| 1 | B | B | 1 | +1 | +1 |
| 80 { 1 | E | E | 1 | +1 | +1 |
| 84 → 2 | A | A | 1 | +0 | +1 |
| 86 → 2 | B | A | 1 | +0 | +1 |
| 88 → 2 | E | Æ | 1 | +1 | +1 |

*Fig. 8*

| STATE | INPUT | OUTPUT | NEXT | SPTR | TPTR |
|---|---|---|---|---|---|
| 90 → 1 | 27(ESC) | A | 2 | +1 | +0 |
| 92 → 2 | P | P | 3 | +0 | +1 |
| 94 → 2 | T | T | 5 | +0 | +1 |
| 96 → 2 | X | X | 7 | +0 | +1 |
| 98 → 2 | Z | C | 3 | +0 | +1 |
| 100 → 3 | P | Q | 4 | +0 | +1 |
| 102 → 3 | Z | A | 4 | +0 | +1 |
| 104 → 4 | P | R | 1 | +1 | +1 |
| 106 → 4 | Z | T | 1 | +1 | +1 |
| 108 → 5 | 114 → ∿∿ | U | 6 | +0 | +1 |
| 110 → 6 | 114 → ∿∿ | V | 1 | +1 | +1 |
| 112 → 7 | X | X | 5 | +0 | +1 |

*Fig. 9*

SYSTEM AND METHOD FOR CHARACTER TRANSLATION

BACKGROUND OF THE INVENTION

1. Field of the Invention

The present invention relates generally to digital computer systems, and more specifically to character or code translators for use within such systems.

2. Description of the Prior Art

In digital computer systems, it is often required to translate characters or codes into other characters or codes. The number of characters generated by the translation may be different from the number of input characters. This general translation function may be used with existing data files, and may also be used to interpret characters communicated with input/output devices such as keyboards or printers.

Typically, procedures for performing such translations are uniquely coded for specific applications. If the translation is only between single characters, a look up table may be used. However, if more complex translations are required, such as translation of multiple input characters to one or more output characters, such look up tables are not sufficient. Therefore, the information regarding the translation is generally hard coded into the translation procedure.

When translators are written with a specific task in mind, it is often difficult to modify them for use with other, similar translation tasks. For example, a keyboard decoder can be used to translate keyboard scan codes into characters for input to a computer system. It is known that the alphabets of different countries typically utilize slightly different alphabets, so that different decoders must be written for each country. For a system which is intended for use in numerous countries, the separate generation of different keyboard decoders can be expensive and time consuming, and can lead to the generation of subtle errors which are difficult to track down.

Another problem with hard coded translators is that they may not easily be dynamically changed. As an example, it is sometimes desirable for a user to translate a file written in a first national character set into a file written in a second national character set. Then, translation of either of these files may be desirable into a third national character set. In addition to the requirement that each of the translators be made available, the user must invoke different translators for each translation to be made. This can complicate the job of the user, leading to undesired inefficiencies.

It would be desirable to provide a translation technique which is powerful enough to handle extremely complex translational tasks. It would be further desirable to provide such a translator which can be easily modified dynamically to provide different translation functions.

SUMMARY OF THE INVENTION

Therefore, according to the present invention, a translator suitable for use in a computer system provides an interpreter and a translation table defining a state machine. The interpreter steps through the states of the state machine defined in the translation table to perform translation of input characters or codes into output characters or codes. The interpreter is fixed, and does not affect the definition of the translation to be performed. The translation function is defined entirely within the translation table, and selecting a different translation table for use by the interpreter selects a different translation function. All of the required actions are defined in the translation table with no additional external procedures being required.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 6–9 are portions of translation tables used for illustrating operation of the present invention.

DETAILED DESCRIPTION OF THE INVENTION

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

Figure 1:
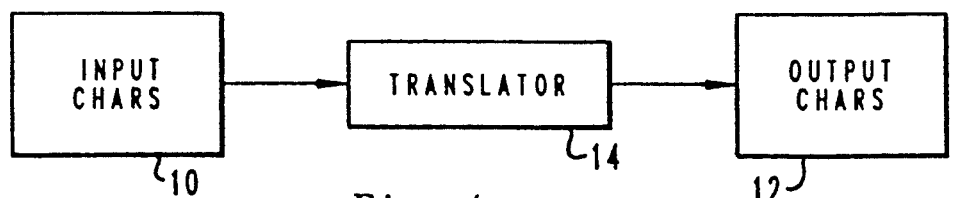
FIG. 1 is a high level block diagram illustrating the function of the translator subsystem according to the present invention.

FIG. 1 illustrates at a high level the function of translating a string of input characters o to a string of output characters 12. Translation is performed in a translator 14. As appreciated by those skilled in the art, the translation function may be simple or complex. An example of a relatively simple translation includes the conversion of keyboard scan codes from a keyboard attached to a computer system into internal codes corresponding to the characters illustrated on the keyboard keys. Another relatively simple example would be certain conversions of ligatures in text files for use on two different systems, one of which supports the use of ligatures directly while the other does not.

A more complex translation example would include the translation of embedded control codes in a text file into commands suitable for controlling a printer. When the text file is sent to a different printer, it is necessary only to change the translator 14, while leaving the embedded control codes in the text file the same regardless of printer type.

It will also be appreciated by those skilled in the art that the translator 14 can be intended for use on one input character or code at a time, such as would typically be the case when the translator 14 decodes keyboard scan codes. When the translator 14 is used to convert text file characters to codes suitable for use with the printer, it would be more typical to supply a longer string of input characters 10 to the translator 14, allowing it to operate on a large number of characters as a result of a single procedure call to the translator 14. The translator described below may be used with equal facility in both types of situations.

Figure 2:
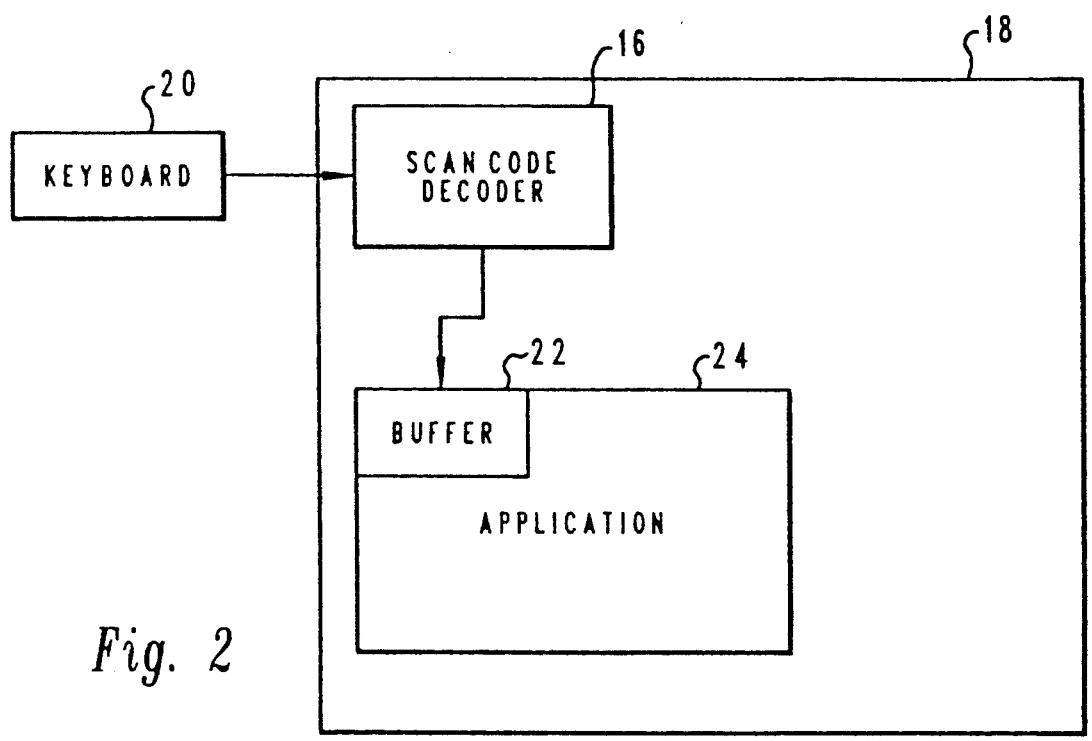
FIG. 2 is a block diagram of a portion of a computer system using a scan code decoder according to the present invention.

Referring to FIG. 2, a translator is used as a scan code decoder 16 within a computer system 18. A keyboard 20 is connected to the computer system 18, with keyboard scan codes being provided to the decoder 16. The decoder 16 translates the scan codes into characters and places them in a buffer 22, from which they are extracted as known in the art by an application program 24. The scan code decoder 16 may be implemented in numerous ways in accordance with the teachings below. It may be solely a software procedure which is invoked as an interrupt handler when a keyboard 20 scan code is received, or which operates in parallel with the application 24 on a multiprocessing system.

The decoder 16 may also be implemented in hardware. As will be explained below, it can be implemented as a simple state machine which accesses a translation table. The translation table may be stored in ROM, or may be down loaded into a RAM accessed by the decoder 16. Down loading of the translation table into RAM allows the function of the scan code decoder 16 to be modified quite easily as will be appreciated from the following description.

Figure 3:
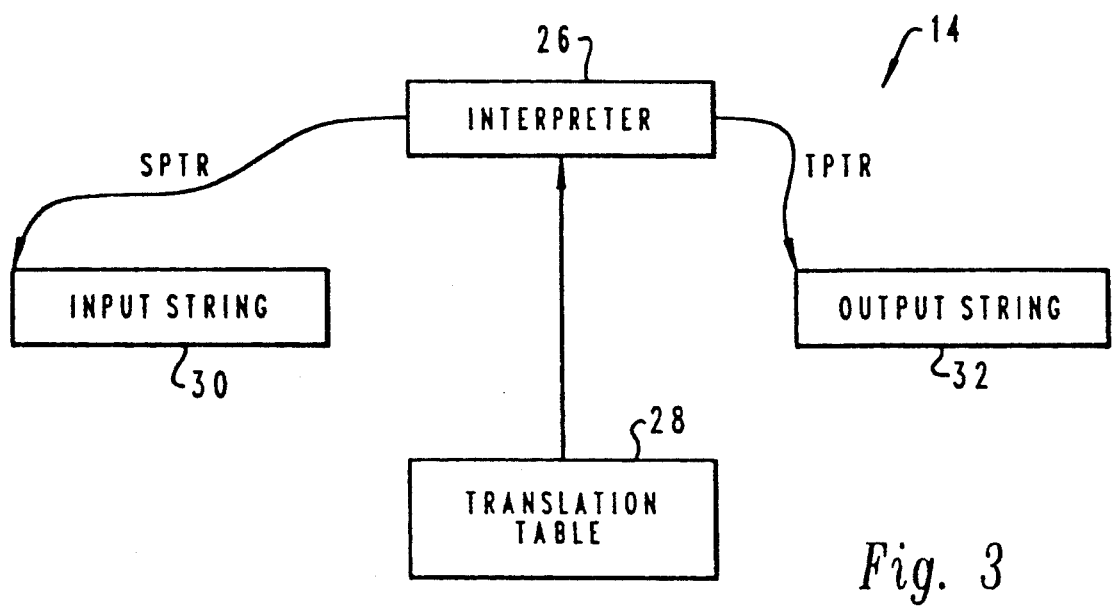
FIG. 3 is a block diagram of a conversion translator according to the present invention.

Referring to FIG. 3, a block diagram of the translator 14 is illustrated. The translator 14 includes an interpreter 26 and a translation table 28. The interpreter 26 is a relatively simple state machine translator with a short loop as will be described further in connection with FIG. 5. The translation table 28 contains the actual translation function of the translator 14. Changing the translation table 28 changes the translation function of the translator 14 without requiring modification of the interpreter 26. Since the interpreter 26 is relatively simple in function, and operates the same regardless of the data contained in translation table 28, the interpreter 26 may be constructed (in hardware) or coded (in software) so as to optimize performance.

In addition to the translation table 28, the interpreter 26 also accesses data structures containing an input string 30 and an output string 32. A pointer SPTR (Source PointeR) points to the location of the current character to be read from the input string 30, and a target pointer TPTR points to the next available location for writing a character to the output string 32. Additional data structures, including scratch pad memory and counters indicating the current length of input string 30 and output string 32, may be accessed by the interpreter 26 and are not shown in FIG. 3. Use of some of these extra data structures is described in more detail below, and their use will be easily understood by persons skilled in the art.

Translation table 28 is a table containing a number of entries, or rows. Each entry defines a unique state for a state machine. The interpreter 26 steps through the state machine defined by the translation table 28 in response to input contained in the input string 30, and generates an output string 32. Each entry in table 28 contains all of the information necessary to define the actions associated with a given state, so that the interpreter 26 need merely interpret the entries in the translation table 28 one at a time in order to perform the translation function.

Although the discussion in this preferred embodiment describes an input string and output string, it will be appreciated by those skilled in the art that single character input and/or output may be used. For example, if the translator 14 is a scan code decoder 16 implemented as an interrupt procedure within computer system 18, it will be written to, generally, access a single scan code made available in a hardware buffer. Thus, those skilled in the art will understand that the following discussions directed to strings also encompasses the use of single characters. The input and output strings and characters are described as being located in system memory, but may also reside in various buffers and registers as will be appreciated by those skilled in the art.

Figure 4:
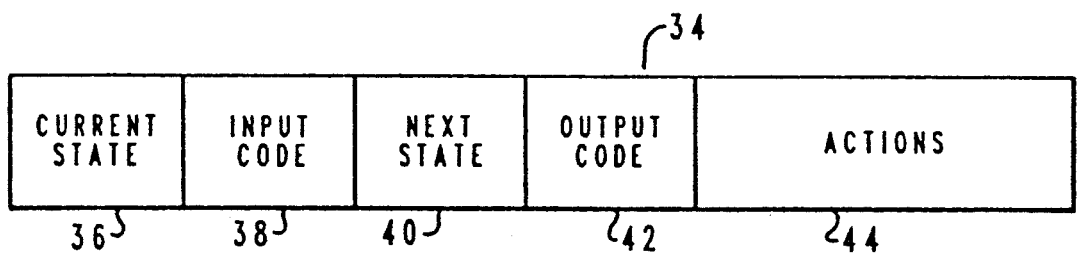
FIG. 4 illustrates a single line of a translation table.

FIG. 4 illustrates a preferred format for each entry 34 within the translation table 28. Each entry 34 contains a current state field 36, an input code field 38, a next state field 40, an output code field 42, and several action fields 44. Current state 36 is preferably simply an identifier used to distinguish various system states. Input code field 38 contains a code which is to be matched with the current character obtained from the input string 30. The current state field 36 and input code field 38 together define a unique state which identifies the entry 34 within the translation table 28.

Next state field 40 contains an identifier indicating the next state which the translator 14 will enter after performing the actions defined for the present state. Output code field 42 contains an output code which is to be placed in the output string 32. The actions field 44 can contain a number of desired actions for performance by the interpreter 26 when the state defined by the current state field 36 and input code 38 is reached. These actions can include, for example, the incrementing of the input string pointer SPTR and the output string pointer TPTR. They may also include the incrementing or decrementing of various counters used by the interpreter 26 to keep track of the lengths of the input string 30 and output string 32.

In one embodiment, the translator 14 can be implemented as a procedure to be called from another application. Parameters passed to the procedure include the source pointer to the input string (SPTR) and the target pointer to the output string (TPTR). The parameters also include numbers indicating the length of the input string area and the output string area, and pointers to the translation table 28 to be used during this procedure call. Since a different translation table 28 could be used during each call to the interpreter 26, it will be appreciated that the translator 14 can be made quite flexible.

In a procedure of the type just described used to achieve character based translations between code pages on a computer system OS/2 available from International Business Machines Corporation, the action fields set forth in Table 1 have proved sufficient to completely define the actions of the translator 14. These actions may be modified as desired according to a particular implementation, and additional actions may be added, without changing the underlying nature of the described system. As shown in Table 1, two bits can be allocated to define any changes made to the source pointer (SPTR) and a source string length counter (LSPTR). Two more bits are allocated to defining how many (if any) bytes are fetched into the interpreter data work area from the location pointed to by the source pointer (SPTR). Two bits are allocated to defining operations on the target pointer (TPTR) and a counter indicating the remaining length of the allocated target string area (LTPTR).

The action encoded in each field is performed when each state is executed by the interpreter 26. The actions of changing pointer values by zero is used to leave SPTR or TPTR stationary while the internal state of the translator 14 changes. As defined in Table 1, the output code (CCODE2) is always moved to the output string 32. However, if this is done without incrementing the pointer TPTR, the next character written to the output string 32 will write over the previously written character. This has the effect of allowing the internal state of the translator 14 to change without generating an identifiable output character for each state change.

TABLE I 2-bits allocated to:
  Increment SPTR by 0 decrement LSPTR by 0
  Increment SPTR by 1 decrement LSPTR by 1
  Increment SPTR by 2 decrement LSPTR by 2
2-bits allocated to
  Fetch 0 bytes via SPTR
  Fetch 1 bytes via SPTR
  Fetch 2 bytes via SPTR
2-bits allocated to:
  Move CCODE2 to area indicated by TPTR, increment TPTR by 0 decrement LTPTR by 0
  Move CCODE2 to area indicated by TPTR, increment TPTR by 1 decrement LTPTR by 1
  Move CCODE2 to area indicated by TPTR, increment TPTR by 2 decrement LTPTR by 2

Figure 5:
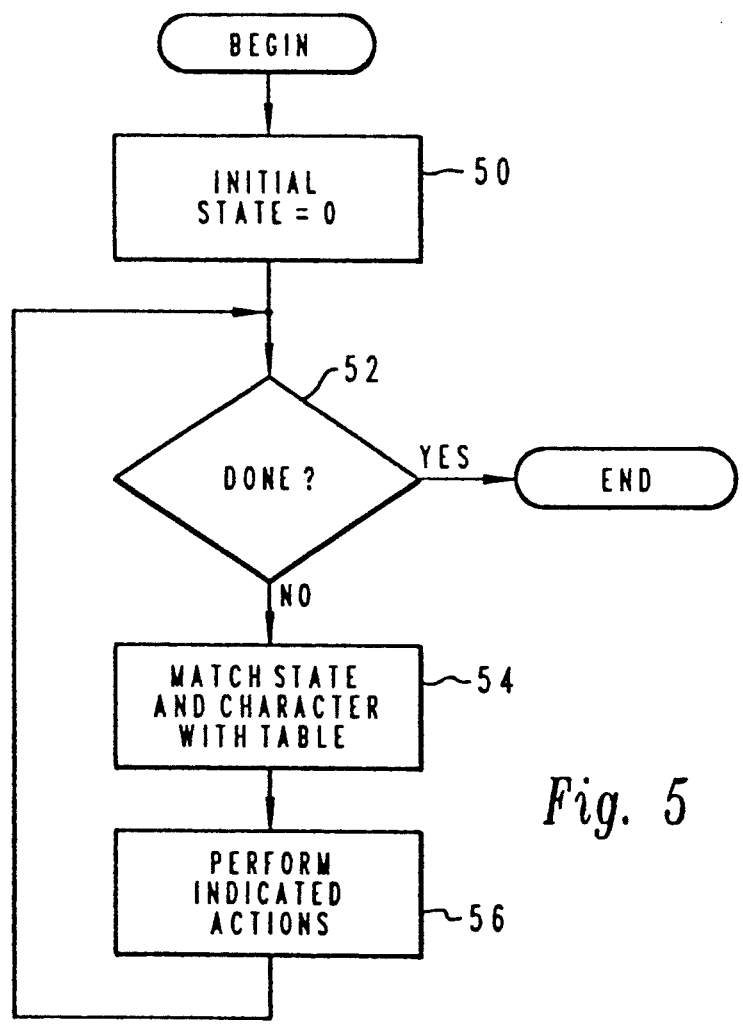
FIG. 5 is a high level flow chart illustrating operation of an interpreter in accordance with the present invention.

The interpreter 26 operates in accordance with the flow chart of FIG. 5 When the interpreter 26 is first invoked, an initial state of zero is entered. This initializes the interpreter 26 for operation. The next step is to check to see if data is available 52. If no data is available, which can be indicated by exhaustion of the data areas set aside for either the input string or output string, or reading of a special end of string character such the '/0' terminator used in the C programming language, operation of the interpreter 26 is completed. If the translation function is not completed, the current state of the translator 14 and the current character being read are matched 54 with the current state field 36 and input code field 38 for each entry within the translation table in order to determine the current unique state. The indicated actions contained within the corresponding entry are performed 56, and control returns to step 52.

Since even a fairly simple translation can require a translation table 28 having a fairly large number of rows, a simple linear scan of all the possible states in the table to determine the matching unique state can be inefficient. As is well known in the art, there are many techniques for speeding up table searches. These include, for example, various techniques for indexing the table, hashing techniques, and so forth. Any searching technique which is appropriate may be used by the interpreter 26, with required performance tradeoffs for the translator 14 typically determining the complexity of the table search algorithm which will be used. Since the interpreter 16 does not change, it can be carefully coded to obtain maximum speed in accessing the table.

FIGS. 6, 7, 8, and 9 illustrate portions of example translation tables 28 which can be used to make simple translations. The tables contained in these figures are extremely oversimplified and intended for illustrative purposes only; actual translation tables 28 will be much larger but can be generated in a straight forward manner by those skilled in the art based on the concepts described in the examples.

In FIGS. 6-9, each entry in the tables has been simplified to include the current states field 36, input code field 38, next state field 40, output code field 42 and two action fields 44. These are represented as the actions to be taken on the source string pointer (SPTR) and target string pointer (TPTR). For purposes of simplifying the illustrations, the pointers SPTR and TPTR will be assumed to always move by a fixed number of bytes, so that they may be incremented to the next character location (indicated by a +1) or left where they are (indicated by a +0). In an implementation which accesses or writes to a hardware buffer, +0 will of course indicate "do nothing", while a +1 indicates that a character (or other code) is to be read from or written to the appropriate buffer.

Referring to FIG. 6, a translation table is shown which defines the translation of an input language containing the characters [1, 2, 3, 4] to the output language [A, B, C, D]. Entry 62 translates a 1 to an A, entry 64 translates a 2 to a B, entry 66 translates a 3 to a C, and 68 translates a 4 to a D. In all cases, the next state is a 1, which is the same as the current state. SPTR and TPTR are both incremented by one position for each character scanned and generated. For example, in line 62 when a 1 is read on the input, an A is generated on the output, the state remains as 1 and both SPTR and TPTR are incremented. This causes SPTR to point to the next character in the input string, and TPTR to point to the next available location for generating the output string 32 The remaining entries 64-68 function in a similar manner.

Referring to FIG. 7, a slightly more complex translation table is illustrated which can translate from an input language utilizing the English alphabet and the ligatures and Æ and Ü. In this translation, the output language does not utilize these ligatures, so that the Æ ligature on the input string generates two separate letters, A followed by E on the output string. The Ü ligature is translated in the output string as a U followed by an E, as is common in some translations from German into English.

Entries 70 illustrate a straightforward translation from codes 1-26 into output characters A-Z. In all cases, the next state is 1, with these states functioning as described above in connection with FIG. 6. In this simplified example, input scan code 27 corresponds to the Æ ligature and scan code 28 corresponds to the Ü ligature. When a code 27 is read on the input (72) an A is written to the output string and the next state is set to state 2. TPTR is incremented, but SPTR is not. This causes the same character to be used again for the next state match. Entry 74 indicates the next state match found by the interpreter 26 matching state 2 with the input of 27. An E is output, completing the translation of the ligature to AE. The next state is set to 1, which is the "normal" translation state. In entry 74, both SPTR and TPTR are incremented.

Line 76 is interpreted in a similar manner when an input code 28, corresponding to Ü, is received. A U is output and the next state is set to state 3. As before, SPTR is not incremented. Entry 78 shows the entry for the second half of the translation of character 28, with an E being generated on the output string.

FIG. 8 illustrates a greatly simplified example which translates in the opposite direction from the Æ ligature translation shown in FIG. 7. In FIG. 8, the input alphabet contains only the characters A, B, E. The output language contains characters A, B, E and Æ. As shown by entries 80, whenever a B or an E is read on the input string it is simply copied to the output string as described above. Whenever an A is read on the input (entry 82) an A is output and the next state is set to state 2. The target pointer (TPTR) is not incremented, since at this time it is not known whether the A which has been read is simply an A, or the first part of an Æ combination, which will be translated into the Æ ligature. Entries 84, 86 and 88 correspond to state 2, and define what occurs upon reading of the next input character after an A. If the next character is a B, an A is output and the next state returned to state 1. This time, the source pointer is not incremented. This has the effect, at this time, of writing to the output string the letter A which was previously read. Then, returning to state 1 without incrementing the source pointer will cause the B to be read again next time, and subsequently written to the output string.

A similar occurrence takes place if an A follows another A. In this case, the table of FIG. 8 assumes that the first A is written as an A, and the second A could either be a single A or the initial letter of an Æ combination. Thus, the A is written out, and the state returned to state 1. SPTR is not incremented. The second A will cause the translator to return to state 2 (entry 82), with further determination of the next following letter to be made at that time.

If an E follows an A, entry 88 will be matched by the interpreter, generating the Æ ligature as the output symbol. The state is then returned to the "normal" state 1.

Referring to FIG. 9, a partial translation table which defines slightly more complex translation functions is illustrated. In FIG. 9, the only entries shown are those corresponding to the more difficult translations to be described. Additional entries would be expected in the table.

The table of FIG. 9 performs the translation of several escape codes into different strings. In this example, an escape code is a two character string on the input string, consisting of the escape character (27) followed by a letter. In FIG. 9, only the letters P, T, X or Z can follow the escape character. Table II shows the translations made by the table of FIG. 9.

TABLE II

| Input Strong | | Output String |
|---|---|---|
| ESC-P | → | PQR |
| ESC-T | → | TUV |
| ESC-X | → | XUV |
| EXC-Z | → | CAT |

Table entries 90-112 perform all of the described translations.

In order to reduce the size of the table, character 114 may be used as a "don't care" indicator. In other words, this character in the input code field 38 generates a match with every character.

Entry 90 describes that, when an escape character is received, the next state is state 2. Some character is output, in this case A, but this character will be overwritten in the future because the target pointer (TPTR) is not incremented. Entries 92-98 define state 2, with one entry corresponding to each of the input characters P, T, X, and Z. The output characters generated are the first characters of the strings as described above and various next states are defined. In each case, since this is not the last character of the output string to be generated, the source pointer (SPTR) is not incremented, while the target pointer (TPTR) is.

State 3 is reached through either entry 92 or entry 98. In state 3, if the character just read in the input string is a P, a Q is output and the next state is state 4. If a Z was used (entry 98) to get to state 3, an A is output and the next state is also set to 4. This illustrates that the numbers in the state column may be used for a number of different translations, since the actual unique state is defined by the combination of the current state and the input code.

Within state 4, the P and the Z generate, respectively, R (entry 104) and T (entry 106) characters on the output string, with a return to state 1. The source pointer is incremented only when the last character of a translated output string is generated. The target pointer is, of course, incremented for each generated output character.

More complex interrelationships of states may be utilized in the tables. For example, entry 94 causes the next state to be set as state 5. Regardless of the input character, state 5 generates a U output and changes to state 6. Again, regardless of the input character, state 6 generates a V and then resets to state 1. These lines are used by both the ESC-T and ESC-X translations to generate the UV portions of the output string. Entry 96, matching ESC-X, jumps to state 7 which is used to output an X character. Entry 112 sets the next state to state 5, which generates a U followed by a V as was the case for the ESC-T escape code. In this manner, the translation table may be made somewhat smaller by reusing entries in combination with a "don't care" character 114. As will be appreciated by those skilled in the art, numerous variations on the state tables may be used to achieve fairly difficult translations.

As will be appreciated by those skilled in the art, the translation table described above can be used to implement, in general, an LR(0) parser. This means that such a table can be used to translate numerous complex languages, as well as the more straightforward character translations described above. In such an LR(0) translator, all of the information used in the translation is contained in the translation table. If more complex actions are required for certain table entries, these may be included in the action fields 44. This allows implementation of such a translator without requiring recourse to multiple external procedures which must be individually coded.

The described translator is useful for implementing a keyboard decoder, with different translation tables being used to integrate the keyboard differently. This is useful when a system is designed for use in different countries. The translator can also be used to good effect to translate text files for use in different countries having slightly different alphabets.

While the invention has been particularly shown and described with reference to a preferred embodiment, it will be understood by those skilled in the art that various changes in form and detail may be made therein without departing from the spirit and scope of the invention.

What is claimed is:

1. A translator for a computer system, comprising:
   a translation table containing a plurality of entries defining a state machine, each entry having the following fields:

a current state field;
an input character field;
an output character field;
a next state field; and
an action field containing an identifier of at least one action to be performed; and an interpreter connected to said translation table for reading input characters, for matching a current translator state and an input character with the current state field and the input character field, respectively, of a currently selected table entry to select a next table entry, and for performing actions defined in the action field of an entry matching the current translator state.

2. The translator of claim 1, wherein said action field comprises:
a first subfield defining an action to be performed on a pointer to an input string; and
a second subfield defining an action to be performed on a pointer to an output string.

3. A keyboard decoder for a computer system, comprising:
means for reading input codes from a keyboard attached to the computer system;
a translation table, having a plurality of entries, for defining a state machine used to interpret input codes read from the keyboard, each entry having the following fields:
a current state field;
an input code field;
an output code field;
a next state field; and
an action field containing an identifier of at least one action to be performed;
an interpreter connected to said reading means and to said translation table for performing state changes and actions defined in said translation table in response to input codes read from the keyboard, wherein the interpreter matches a current translator state and an input code with the current state field and the input code field, respectively, of a currently selected table entry to select a next table entry; and
means for writing output codes to a selected location in response to actions defined in the action field of selected table entries of the translation table.

4. The keyboard decoder of claim 3, wherein the selected location comprises a buffer accessible by an application program executing on the computer system.

5. The translator of claim 3, wherein said action field comprises:
a first subfield defining an action to be performed on a pointer to an input string; and
a second subfield defining an action to be performed on a pointer to an output string.

6. The translator of claim 3, wherein said interpreter is a software procedure invoked as an interrupt in response to a scan code being generated by the keyboard.

7. A method for translating input codes to output codes, comprising the steps of:
providing a translation table having a plurality of entries, each entry having a current translator state field, an input code field, a next translator state field, and an action field;
reading a next input code;
matching a current translator state and the next input code with the translation table current translator and input code fields to select a corresponding entry;
performing an action defined by the selected entry action field; and
setting the current translator state to a next state defined in the selected entry next translator state field.

8. The method of claim 7, wherein the actions defined in the translation table entries are selected from a set comprising:
writing an output code to a selected location;
reading a next input character;
changing a value contained in a counter;
changing a value of a pointer; and
performing no action.

* * * * *